(12) United States Patent
Meinhart et al.

(10) Patent No.: US 12,462,029 B2
(45) Date of Patent: Nov. 4, 2025

(54) VIRUS AUTONOMOUS DEFENSE SYSTEM (VADS)

(71) Applicant: The United States of America, as represented by the Secretary of the Navy, Crane, IN (US)

(72) Inventors: Michael A. Meinhart, Washington, IN (US); Bryan Daugherty, Sandborn, IN (US)

( * ) Notice: Subject to any disclaimer, the term of this patent is extended or adjusted under 35 U.S.C. 154(b) by 307 days.

(21) Appl. No.: 17/885,959

(22) Filed: Aug. 11, 2022

(65) Prior Publication Data

US 2023/0121158 A1 Apr. 20, 2023

Related U.S. Application Data

(60) Provisional application No. 63/231,900, filed on Aug. 11, 2021.

(51) Int. Cl.
| G06F 21/56 | (2013.01) |
| G06N 5/01  | (2023.01) |
| G06N 5/025 | (2023.01) |

(52) U.S. Cl.
CPC ............ *G06F 21/566* (2013.01); *G06N 5/01* (2023.01); *G06N 5/025* (2013.01); *G06F 2221/034* (2013.01)

(58) Field of Classification Search
None
See application file for complete search history.

(56) References Cited

U.S. PATENT DOCUMENTS

| 2019/0312890 A1* | 10/2019 | Perilli ................... H04L 63/145 |
| 2021/0026722 A1* | 1/2021 | Bhatia ................... G06F 11/079 |
| 2021/0273957 A1* | 9/2021 | Boyer ................... G06F 21/554 |
| 2022/0038428 A1* | 2/2022 | Rodniansky ........... G06N 5/022 |
| 2022/0224716 A1* | 7/2022 | Salji ..................... H04L 63/1441 |
| 2022/0224723 A1* | 7/2022 | Crabtree ................ H04L 63/20 |
| 2022/0366040 A1* | 11/2022 | Marbouti ............... G06N 3/045 |

* cited by examiner

*Primary Examiner* — Nelson S. Giddins
(74) *Attorney, Agent, or Firm* — Naval Surface Warfare Center, Crane Division; Patrick B. Law

(57) ABSTRACT

Apparatus and methods are provided in relation to an autonomous computer system that can defend against known and unknown virus and malware attacks. Various embodiments include a Virus Autonomous Defense System (VADS) can on its own without human intervention once it is turned on. Embodiments can incorporate hardware coupled with various types of artificial Intelligence software and systems to perform response functions including closing ports that are being compromised, analyze an attack, and develop software scripts (signatures) to defend against future attacks, and create responses which defeat an attack that can include a follow on response of freeing up an attacked port for continual operation.

9 Claims, 6 Drawing Sheets

VIRUS AUTONOMOUS DEFENSE SYSTEM (VADS)

CROSS-REFERENCE TO RELATED APPLICATIONS

The present application claims priority to U.S. Provisional Patent Application Ser. No. 63/231,900, filed Aug. 11, 2021, and entitled "VIRUS AUTONOMOUS DEFENSE SYSTEM (VADS)," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200105US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD

The present invention relates generally to computer network defense. More particularly, the invention pertains to artificial intelligence (AI) systems that may be used for defense against cyber-attacks such as viruses, hacks, and malware.

BACKGROUND

Data insecurity on the internet is on track to become physical insecurity as more and more items are connected to the internet including cars, phones, coffeepots, home security systems, appliances, and all manner of everyday things that surround us. The networking of such devices opens them up to cyber-attacks such as virus and malware attacks, as well as hacking attacks.

Current methods of combating cyber-attacks typically include passive security or through human response to these attacks. Human response to these attacks is costly in time, money, and resources. Additionally, reactions to these attacks happen slowly and after the attacks have started. Employees tasked with this job can also be overworked and or can miss subtle changes in network activity that may indicate that an attack has happened. Furthermore, due to the ever increasing number of cyber-attacks originated from foreign powers and the billions of dollars in lost data that are taken during these attacks, there is a need for systems and methods that can immediately stave off these attacks and not leave users to have to wait for patches to be produced by the cyber community, which can typically take hours or days. Accordingly, the continually evolving nature of technology and networking and the rising number of cyber-attacks requires more advanced and quicker methods and systems for defending networked devices against such attacks.

SUMMARY

Disclosed is an autonomous computer defense system that defends against known and unknown viruses and malware attacks. Once the system is turned on, it is able to operate autonomously without human intervention. In some embodiments, the system may incorporate existing hardware coupled with artificial intelligence processes to close ports that are being compromised or under attack, analyze the attack, and develop software scripts (signatures) to defend against any future attacks, thus freeing up the port for continual operation.

In other aspects, an artificial general intelligence (AGI) system is disclosed that provides total autonomous control over removing threats from any system with which it is connected. Embodiments of the invention can include systems that have artificial intelligence/machine learning (AI/ML) systems incorporating a variety of approaches to provide adaptive, quick, and proactive responses to address system vulnerabilities. An automated system can include, among other things, a set of reverse engineering functions to identify functionality of software code and match it against profiles for available code replacement software modules, which can be used for automated replacement/insertion into vulnerable source code followed by fix verification and original functionality verification.

Additional features and advantages of the present invention will become apparent to those skilled in the art upon consideration of the following detailed description of the illustrative embodiments including a best mode of carrying out the invention as presently perceived.

BRIEF DESCRIPTION OF THE DRAWINGS

The detailed description particularly refers to the accompanying figures in which.

DETAILED DESCRIPTION

Figure 1:
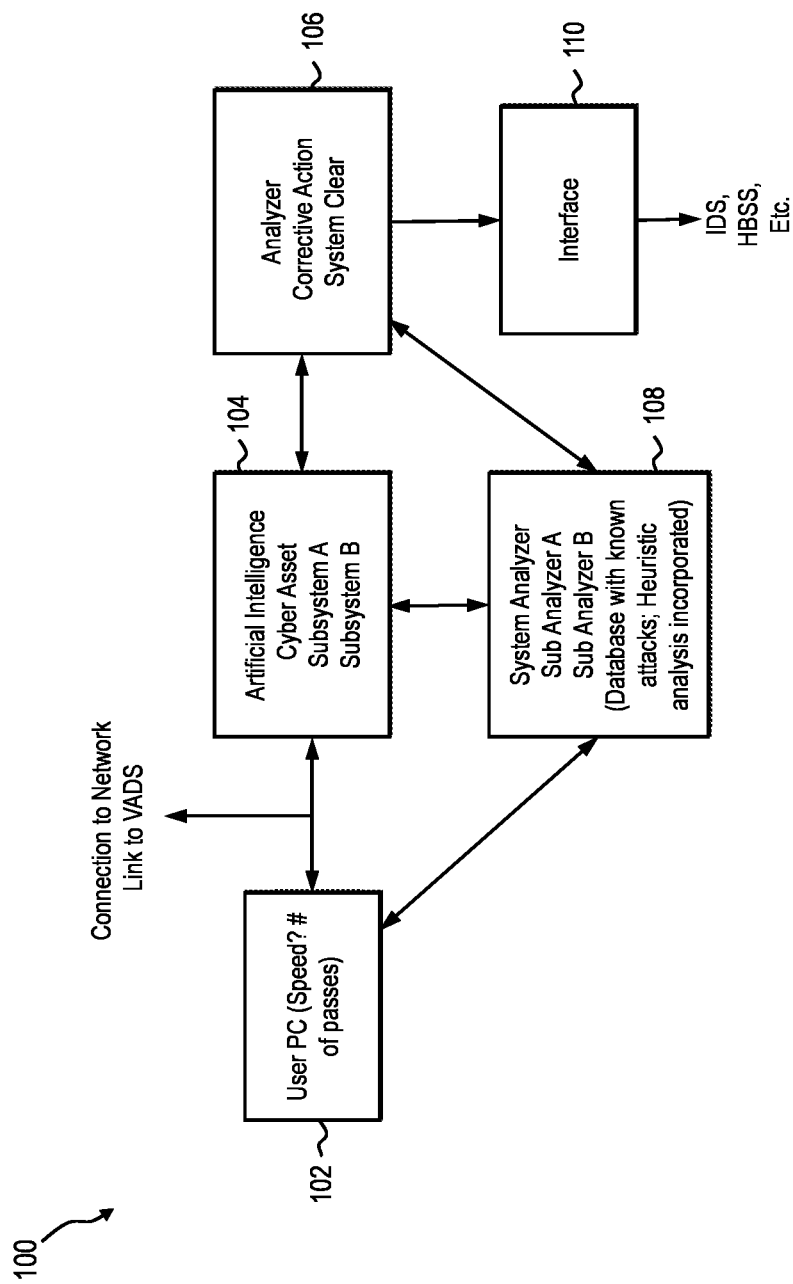
FIG. 1 illustrates a high level block diagram of a VAD system according to aspects of the disclosure.

The present invention now will be described more fully hereinafter with reference to the accompanying drawings, which are intended to be read in conjunction with the detailed description and any preferred and/or particular embodiments specifically discussed or otherwise disclosed. This invention may, however, be embodied in many different forms and should not be construed as limited to the embodiments or example set forth herein. Instead, these embodiments are provided by way of illustration only and so that this disclosure will be thorough, complete and will fully convey the full scope of the invention to those skilled in the art. Further, the embodiments or examples of the invention described herein are not intended to be exhaustive or to limit the invention to precise forms disclosed. Rather, the embodiments selected for description have been chosen to enable one skilled in the art to practice the invention.

As mentioned before, current methods of combating cyber-attacks utilizing human input are costly in time, money, and resources, and reactions to these attacks happen slowly and after the attacks have started. Employees tasked with this job can also be overworked or can miss subtle changes in network activity that may indicate that an attack has happened. In contrast, an autonomous system can work around the clock, can detect and react to an attack more quickly, and is less costly to maintain.

Accordingly, the presently disclosed system and methods include the use of an autonomous computer system, termed herein as a "Virus Autonomous Defense System" (VADS), which can defend against known and unknown (e.g., determined through heuristic processes) viruses and malware attacks. In aspects, the system is configured to operate on its own, without human intervention, once it is turned on. Furthermore, embodiments can incorporate existing hardware coupled with artificial intelligence/machine learning software to close ports that are being compromised, analyze the attack, and develop software scripts (signatures) to defend against any future attacks thus freeing up the port for continual operation.

Further embodiments of the invention are designed to work with modular source code, which can have open architecture specifications that enable hot swapping of source code identified with a particular vulnerability or an attack profile that addresses a specific type of attack. For example, viruses can be designed to use specific function calls with predefined parameter lists for variables associated with a particular function call. A scanner can identify a particular type of attack that uses a particular set of program function calls in a virus or attack that targets a vulnerable program's function or method calls. A further embodiment of the invention can then scan for an alternative software module associated with the targeted function call, find it, then open source code for a targeted program, remove and replace the targeted software module having the vulnerable function call(s) with another function call that is non responsive to the virus' function call(s). The system can then recompile the modified source code, re-execute the modified program, verify the attack is no longer capable of operating or targeting the modified program, verify no system failures or system bugs due to the swapping of code modules, and then return the program to operation.

Referring to FIG. 1, aspects of an exemplary VAD system 100 are shown. The system 100 may include and/or be connected or coupled with a computer 102 (e.g., a User PC). In some aspects, the computer 102 may be the client device or system that is being protected. The system 100 further includes a first module 104 including an Artificial Intelligence Cyber Asset, which further may include a number of subsystems such as a Subsystem A and a Subsystem B. The first module 104 is communicatively coupled with the computer 102, as well as a network such as the internet.

Further, system 100 includes a second module 106 coupled with the first module 104 and includes an analyzer corrective action system and a system clear determination/implementation. Additionally, system 100 includes a third module 108 having a System Analyzer, which may further include a number of sub-analyzers, such as Sub Analyzer A and Sub Analyzer B. This exemplary system analyzer in module 108 may include a database with known attacks and also incorporating heuristic analysis for determining unknown attacks. As illustrated, the third module 108 may be communicatively coupled with each of the computer 102, first module 104, and second module 106. Additionally, the system 100 may include an interface 110 that provides output data to a user, or to other devices or software such as an intrusion detection system (IDS) or a host based security system (HBSS), and other similar devices/software.

According to some aspects, a first part or function of the system 100 analyzes all incoming packets into a system and determines if these packets have been infected by malicious software. If this is the case, the system 100 cleanses these packets of the malicious software and allows the continual flow of packets to the appropriate destination, such as with module 106. A second part or function of the system 100 protects a protected system from potential "Hacks" from the "outside world" by analyzing the system for potential flaws (Zero Day), unauthorized traffic, and increased traffic on authorized ports. Any of these trigger an automatic response from the system 100 to repair flaws in the protected system that allowed the unwanted traffic, thus inhibiting a hacker from compromising the system. Also included is the ability to control external devices (Drones, etc.) that will be utilized for analyzing the environment against potential threats. VADS will control all aspects of these devices.

In operation, the system 100 may also include scanning functions that search for profiles associated with network vulnerabilities or attacks. When such attacks are identified, then a library of rule based instructions are scanned for a match of the profile that has been detected in a vulnerability within a particular program. If a match is found then source code is called up and a search is performed for the program and code associated with a vulnerability. Segments of code associated with the source code are compared against available libraries of code such as code associated with function calls that are associated with a particular vulnerability. The source code is automatically recompiled and the vulnerable program is executed then an analysis program will then run to determine if the same or similar vulnerability as previously identified still can be detected. If the same or similar vulnerability cannot be detected, then processing terminates. Alternatively, if the same or similar vulnerability can be detected, then the original source code is recalled and another modular code block associated with a candidate fix to the identified vulnerability is used to replace identified vulnerable code, and subsequently recompiled, re-executed, and the vulnerability assessment is repeated to determine if the next candidate correction has corrected the identified vulnerability. Once a vulnerability has been removed by the artificial intelligence system (e.g., module 104), then another analysis software system is run which executes the compiled source code for the corrected program to determine if the system can successfully execute its previous functionality and to determine if the program can continue to operate without system failure or bug detection. If bugs or system operation failure is detected, then the process repeats to determine if another modular or software function can be swapped into the vulnerable software to both address identified vulnerability and ensure that the identified program can still operate and perform its previous functions.

Figure 2:
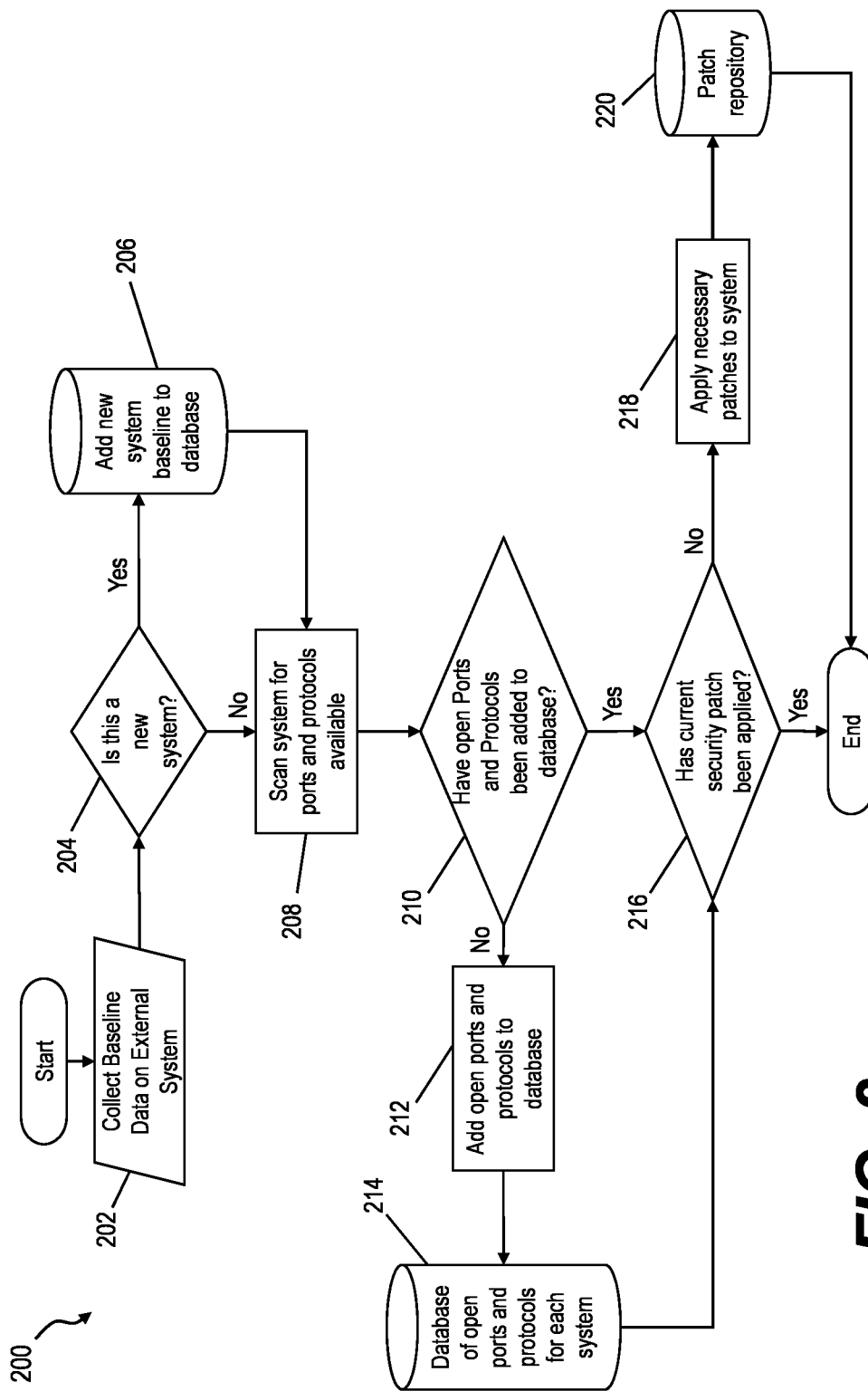
FIG. 2 illustrates an exemplary method for cyber-attack defense using a VAD system (VADS), such as the system of FIG. 1, including an initial scan of a new system and logging results of new system baseline into the database for future comparison according to aspects of the disclosure.

In other aspects, VADS system 100 and, more specifically, AI module 104 may include an artificial intelligence system including a rule engine and at least one artificial intelligence rule base configured for performing viral analysis defense system functions. Additionally, system 100 may comprise a computer system architecture configured to store and operate elements of the VADS. Furthermore, the interface 110 may be further configured to facilitate operation of elements of the VADS through either interaction with a human operator or other devices. Moreover, the first module 104 may be configured for a first section of the VAD system and include an artificial intelligence cyber asset system including a plurality of subsystems, such as subsystems A and B shown in FIG. 1. Furthermore, the third module 108, may a system analyzer that includes a plurality of sub-analyzers (e.g., sub analyzer A and sub analyzer B shown in FIG. 1), where the system analyzer (i.e., module 108) also includes one or more databases storing/logging known attacks, a heuristic analysis subsystem, patches, etc., FIG. 2 is a flow chart depicting an implementation or method 200 of the Virus Autonomous Defense System (VADS) initial scan of a new system and logging results of a new system baseline into the database for future comparison. Additionally, method 200 also includes logging new systems ports, protocols and network traffic and updating to a database for future comparison.

Referring to FIG. 2, data will be collected by retrieving information from a client system that is connected to VADS. A new client system (i.e., the new device(s) to be protected) will be scanned and the baseline software of the client system will be catalogued into a database. As shown at block 202, baseline data on the client or external system is collected and a determination is made whether the client system is new at block 204. If the system is new, this baseline data is added to a database as shown at 206 and flow proceeds to block 208 where the client system is scanned for available ports and protocols. Alternatively, if the system is not new as determined at decision block 204, flow proceeds directly to block 208.

Next, method 200 proceeds to decision block 210 where a determination is made whether open ports and protocols have been added to a database. Is not, flow proceeds to block 212 where the open ports and protocols are added to the database, as further shown at block 214, and then flow proceeds to decision block 216. In the alternative at block 210, if the open ports and protocols have been added to the database already, then flow proceeds directly from block 210 to block 216.

At decision block 216, a determination is made whether a current security patch has been applied. If so, method 200 ends. If not, flow proceeds to block 218 where necessary patches are applied to the client system based on a patch repository or database 220.

The processes of method 200, in part, ensure that the VADS will be able to identify any changes to the baseline throughout the life cycle of the protected client systems and take appropriate actions when necessary. In addition, ports, protocols and network traffic baselines are established thereby and catalogued into a database once the new client system is connected. This database will be used to determine any malicious activity occurring from internal or external sources (e.g., hacks).

Figure 3:
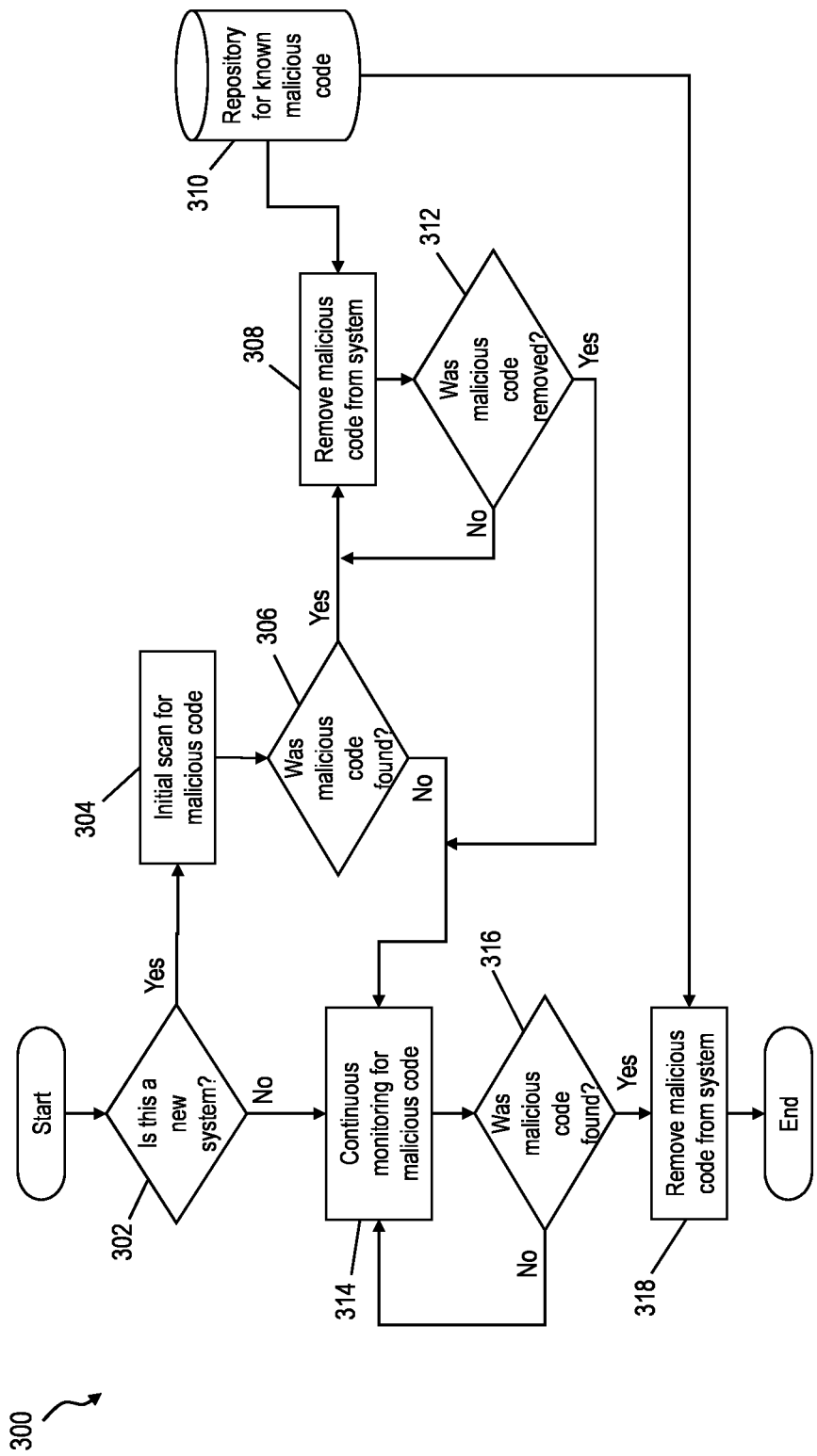
FIG. 3 illustrates a flow chart depicting another implementation of the VADS of FIG. 1 pertaining to removal of either know or unknown (Heuristic) malicious software according to aspects of the disclosure.
Figure 4:
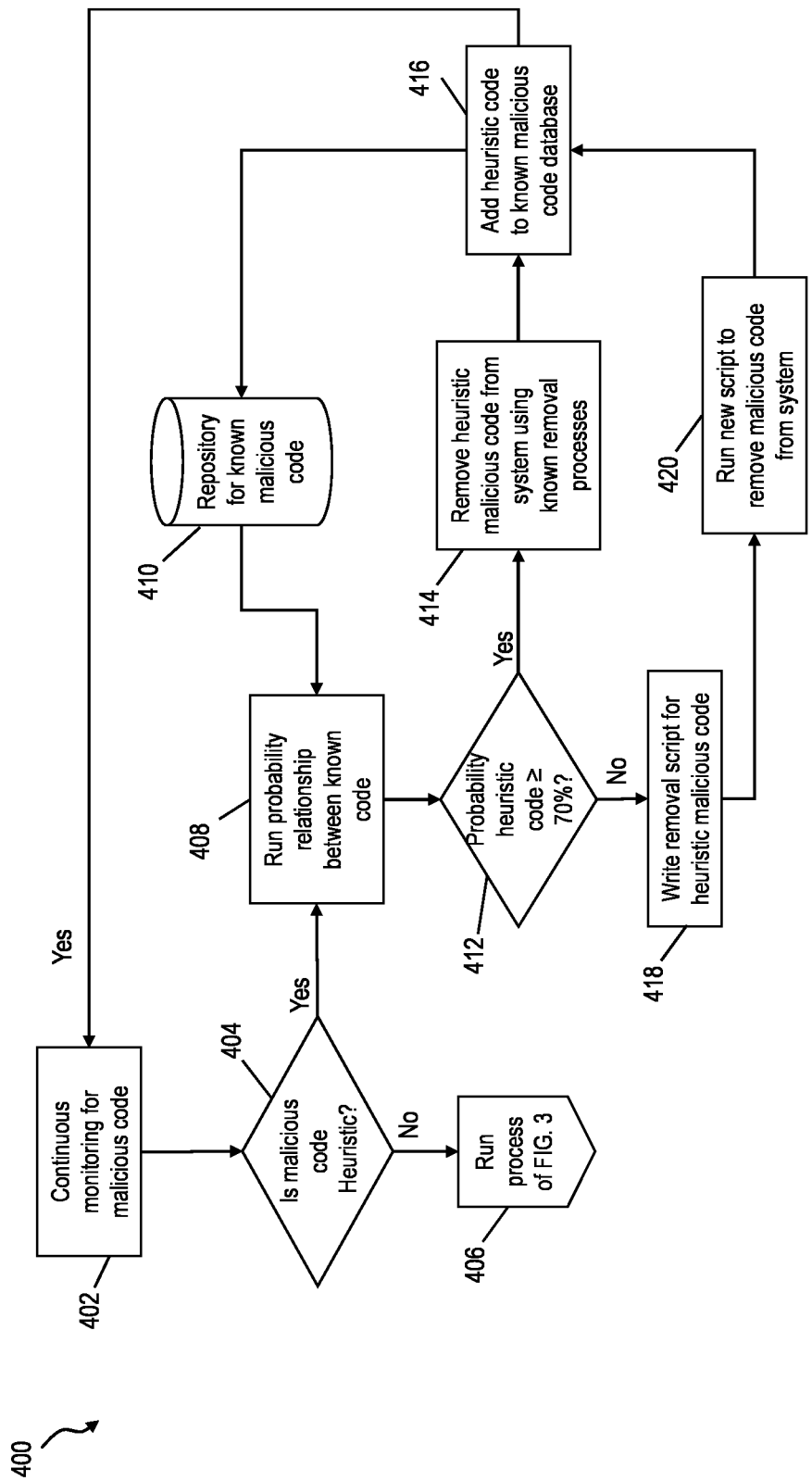
FIG. 4 illustrates a flow chart depicting further processes of the flow chart of FIG. 3 including processes implemented when such malicious software is found according to aspects of the disclosure.

FIGS. 3 and 4 are flow charts depicting another implementation of the VADS pertaining to malicious software removal of either know or unknown (Heuristic) software and the process that occur when such malicious software is found.

Referring to FIG. 3, in particular, this method or implementation 300 of the present invention advantageously provides continuous monitoring of a client system for malicious software. This monitoring is accomplished by initially scanning the new system for malicious software and once confirmed, the VADS will clean the client system and continually monitor the client system thereafter.

In particular, FIG. 3 illustrates that at a first decision block 302, the VADS determines if the client system is a new system. If so, then flow proceeds to block 304 for an initial scan for malicious code. If no malicious code is found, flow proceeds to a block 314, which will be discussed later. Alternatively, if malicious code is found as determined at block 306, the flow proceeds to block 308 where the VADS removes the malicious code from the client system, which may utilize a repository database 310 storing known malicious code. After block 308, a check is made whether the code has been removed as shown at decision block 312, wherein the process 300 loops back to block 308 if the code is not yet removed.

Once the code is removed as determined at decision block 312, flow proceeds to block 314 for continuous monitoring of malicious code in conjunction with decision block 316. During monitoring, if malicious code is found as determined at block 316, flow proceeds to block 318 to remove the code from the client system (with reference to database 310).

Referring to FIG. 4, the method 400 illustrated therein is also intended for the removal of malicious software similar to FIG. 3, but to further account for unknown malicious code or software. If the malicious software has not been entered into the database (heuristic) then the VADS will determine the relationship of the Heuristic code to the known database. Once a similarity match is accomplished, then VADS will excise the unknown portion of the Heuristic code and embed it with the matching code. This, in turn, will generate a new removal patch that may be used to remove the heuristic code from the client system, thus returning the system to normal operation.

In particular, FIG. 4 illustrates further methodology 400 of the continuous monitoring described in connection with FIG. 3. As shown, block 402 show continuous monitoring for malicious code that further accounts for unknown code by use of a heuristic process. As shown in connection with this determination, if malicious code is found, a check is made whether the code is unknown (i.e., in need of a heuristic to determine further details). If the code is not unknown (or "heuristic") as determined at decision block 404, then flow proceeds to the processes shown in FIG. 3 as illustrated by block 406.

Alternatively, if the malicious code detected is heuristic, then flow proceeds to block 408 where a probability relationship is run between the detected code and a known malicious code as shown at block 408, with reference to a known, broad, database or repository of malicious code 410. Flow then proceeds to decision block 412, wherein method 400 determines if the probability is equal to or above a minimum threshold, such as 70%, although this is merely an exemplary percentage and the invention is not necessarily limited to this value. If the code is equal to or greater than the minimum threshold probability, flow proceeds to block 414 wherein the heuristic malicious code is removed from system using known removal processes as the code is close enough to known codes. Flow proceeds from block 414 to block 416 where the heuristic code is added to a known malicious code database (e.g., 410) and flow proceeds back to the monitoring at block 402.

Alternatively at block 412, if the code is less than the minimum threshold probability, flow proceeds to block 418 wherein the VADS is configured to write a removal script (or accept input thereof) for the heuristic malicious code. The new script is then run to remove the malicious code from the client system as shown at block 420 and flow proceeds to block 416, described before. The VADS may also log the original code of the heuristic malicious code and the newly created patch from block 418 into the malicious code database (e.g., 410) for future use.

It is noted that process 402 may be correlative to the process 314 in FIG. 3 and may run in parallel where known codes are handled by the processes of FIG. 3 and unknown codes are handled by the processes of FIG. 4.

Figure 5:
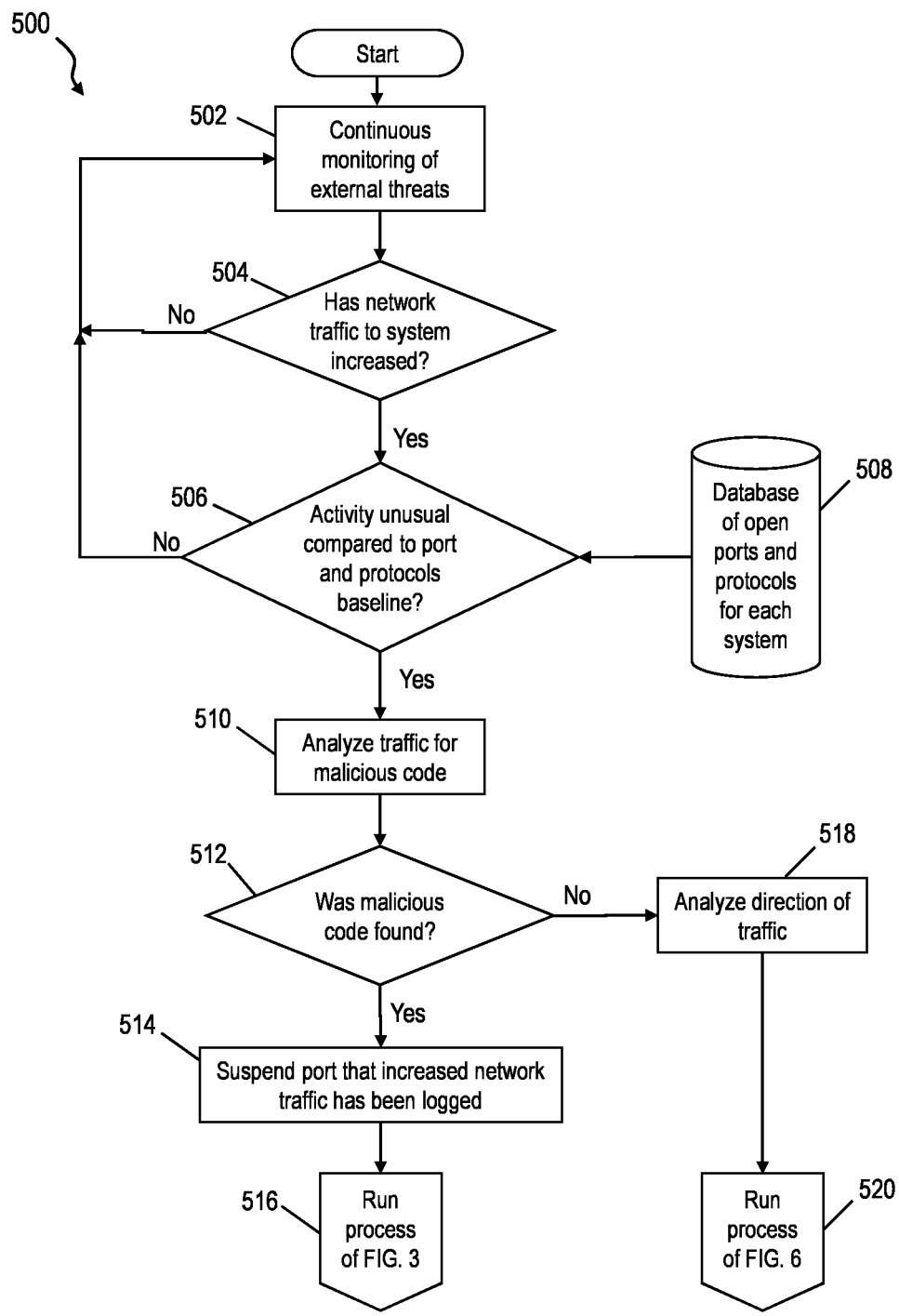
FIG. 5 illustrates a flow chart depicting another implementation of the VADS of FIG. 1 pertaining to cyber hacking and the process to inhibit continual hacking and repair of known or unknown hacks against the system according to aspects of the disclosure.
Figure 6:
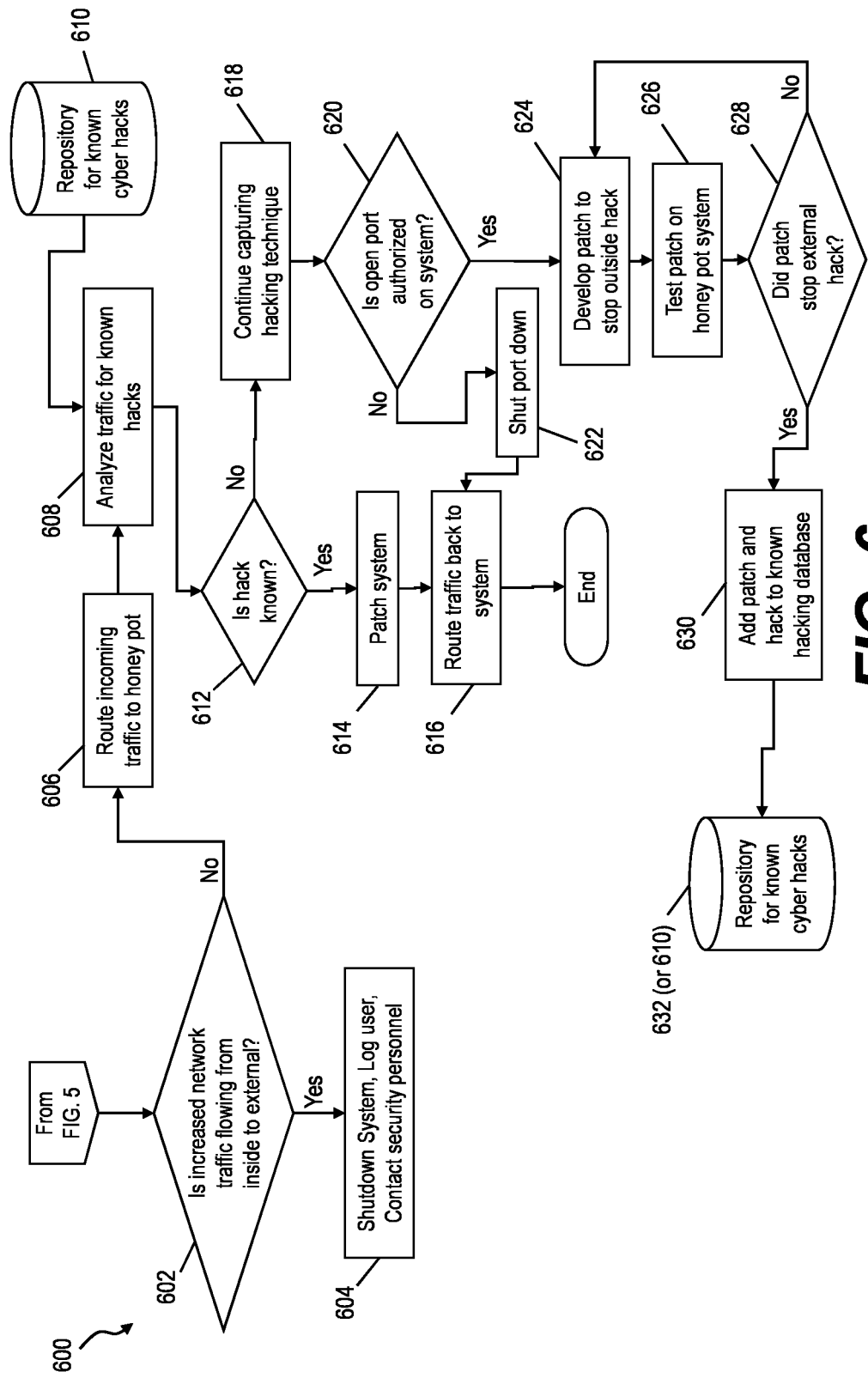
FIG. 6 illustrates a flow chart depicting further processes of the flow chart of FIG. 5 including processes for repair of known or unknown hacks against the system according to aspects of the disclosure.

FIGS. 5 and 6 are flow charts depicting another implementation of the VADS pertaining to cyber hacking and the processes that may be implemented to inhibit continual hacking and repair of known or unknown hacks against the client system.

Referring to FIG. 5, this figure shows a flow chart of a method 500 for network traffic analysis of the client system and a potential increase in network traffic above the baseline that was discussed in connection with FIG. 2. If network traffic increases above a predetermined threshold (e.g., 10%) established from the baseline, the VADS will then start analyzing this increased network traffic to determine if it is coming from an internal source or an external source, which is indicative of a hack. In addition, the increase network traffic will be scanned for malicious code. If malicious code is found to be the suspect for increased network traffic, then the removal process will be executed as described in FIG. 3.

As shown in FIG. 5, method 500 include continuous monitoring of external threats as shown at block 502. Further, method 500 includes a check at decision block 504 whether the network traffic to the client system has increased (e.g., increased above the predetermined threshold, such as 10% above the port and protocols baseline). If the traffic has not increased, flow loops back to block 502. If traffic has increased (e.g., increased above the predetermined threshold), flow proceeds to decision block 506 to further check whether the activity is unusual as compared to the port and protocols baseline. The decision at block 506 may be made with reference to a database 508 of open ports and protocols for each client system. If the increased activity is not unusual, flow loops back to block 502. However, if the activity is unusual, then flow proceeds to block 510 where the VADS analyzes the traffic for malicious code.

Next, a determination is made at block 512 whether malicious code was found during the processes of block 510. If malicious code was found, then the port that experienced the increased network traffic is suspended and logged and flow then proceeds to the processes 300 illustrated in FIG. 3 as shown at block 516. This call of method 300 is performed as it is presumed or likely that the malicious code is the cause of the increased network traffic rather than a hack.

Alternatively, if no malicious code is found through the processes of block 512, flow proceeds to block 518 where the direction of the traffic is analyzed. After the traffic flow analysis of block 518, flow proceeds to block 520 to call the processes of FIG. 6, which are discussed below.

FIG. 6 illustrates a method or implementation 600 that is linked to method 500 of FIG. 5 for instances where the increased network traffic is caused by either an insider threat or an outsider (external) threat. Once it has been determined that no malicious code was involved in the increased network traffic back at block 512 and the direction of the traffic at 518, method 600 first determines if the increased network traffic has been determined to be coming from inside the network (unauthorized) as determined at a decision block 602. If the threat is internal (i.e., network traffic flowing inside to external) then a port shutdown will occur and information of the user and time is logged as shown at block 604. VADS may be further configured to alert or contact security personnel (e.g., via email and/or text) to ensure all appropriate actions are taken. Once the internal threat has been resolved in this instance, then VADS will allow network traffic through the previous affected port.

Alternatively, if the flow is from external to internal as determined in block 603, flow proceeds to block 606 where the VADS directs all network traffic related to the port to a honey pot. Once traffic is directed to the honey pot, a more detailed analysis of the threat can be determined in the subsequent processes of method 600. In particular, method 600 includes analyzing the traffic for known hacks as shown at block 608, with reference to a repository or database of known cyber hacks shown at 610. If the hack is known as determined at block 612, then flow proceeds to block 614 for application of a patch to the client system and then routing of traffic back to the system as shown in block 616.

Alternatively at block 612, if the hack is not known, flow proceeds to block 618 where capture of the hacking technique is continued. Next, a determination is made whether the open port is authorized on the client systems as shown at decision block 620. If the open port is not authorized flow proceeds to block 622 where the VADS shuts down the client system port and flow proceeds back to block 616. On the other hand, if the open port is authorized as determined at block 620, flow proceeds to block 624 where a patch is developed to stop the outside hack. Next, the developed patch is tested on the honey pot system to determined its efficacy in stopping the hack as shown at block 626. If the patch fails to stop the external hack as determined at block 628, flow proceeds back to block 624 for further development of the patch. Alternatively, the patch stops the external hack, then flow proceeds to block 630 where the patch and hack are added to a known cyber hack database shown at 632. It is noted that database 630 may be common with database 610 or a separate database as shown. Once this is accomplished then network traffic will be rerouted from the honey pot back to the client system to resume normal operations.

As described above, if the increase network traffic has been determined to be an unknown external hack, then the further analysis of the external hacking will be viewed in such that the VADS will be able to determine how to defeat this external hack with a patch (e.g., block 624). Once this determination of successful patching against the external hacking attempt has be verified (i.e., network traffic can resume to the baseline level) at block 628, then the patch will be applied to the client system. Again, once the patch has been applied to the client system, then network traffic will be rerouted from the honey pot back to the client system for resuming of normal operations (i.e., the VADS will return to a continuous monitoring mode as described in FIG. 2). The newly created patch to the unknown external hacking attempt will be catalogued in the database for future use as described above in connection with blocks 630 and 632.

In further aspects, it is noted that presently disclosed VADS may interface with any cyber system and provide automated functions beyond just antivirus and anti-hacking capabilities. According to still further aspects, the end user or client system may access the VADS through an application programming interface (API) or a similar software interface. Once the access is established, the Artificial Intelligence (e.g., module 104) will start accessing all aspects of the client system to maintain and protect the system, including patching, and loading updates etc.

As will be appreciated by those skilled in the art, the present disclosure provides a completely autonomous defense system that can defend against known and unknown (heuristic) virus and malware attacks. This system may operate on its own without human intervention once it is turned on. In other aspects, the system may incorporate existing hardware coupled with Artificial Intelligence software to close ports that are being compromised, analyze the attack and develop software scripts (signatures) to defend against any future attacks, thus freeing up a port for continual operation.

Although the invention has been described in detail with reference to certain preferred embodiments, variations and modifications exist within the spirit and scope of the invention as described and defined in the following claims.

The invention claimed is:

1. A Viral Autonomous Defense System (VADS) for protection of at least one client system, the VADS comprising:
   a first module communicatively coupled with the at least one client system, the first module comprising an artificial intelligence cyber asset system including a rule engine and at least one artificial intelligence rule base configured for performing viral analysis defense system functions for the at least one client system;
   a second module communicatively coupled with the first module, the second module comprising an analyzer corrective action system and clear determination system;
   a third module communicatively coupled with the at least one client system, the first module, and the second module, the third module comprising a system analyzer comprising a plurality of sub-analyzers, the system analyzer including a database storing known attacks and a heuristic analysis subsystem; and
   an interface communicatively coupled with the second module and configured to output data to a user or another device;
   wherein at least one or more of the first, second and third modules is configured to utilize machine learning to generate software scripts to defend against future attacks of the at least one client system including generating at least one removal script for removing malicious code.

2. The VADS of claim 1, wherein at least one or more of the first, second and third modules is configured to:
   determine one or more open ports and protocols available on the client system and whether security patches have been applied to the one or more open ports and protocols;
   apply patches from a patch database to those ports and protocols of the one or more open ports and protocols that have not previously had a security patch applied.

3. The VADS of claim 1, wherein at least one or more of the first, second and third modules is configured to:
   monitor the client system for one or more malicious codes; and
   remove the one or more malicious codes from the client system when the one or more malicious codes are detected during monitoring of the client system.

4. The VADS of claim 3, wherein at least one or more of the first, second and third modules is further configured to:
   determine when at least one of the one or more malicious codes includes an unknown malicious code;
   compare the unknown malicious code with a known malicious code to determine a probability relationship between the unknown malicious code and the known malicious code;
   determine whether a probability relationship is equal to or greater than a predetermined percentage value;
   remove the unknown malicious code using known removal processes when the probability relationship is equal to or greater than the predetermined percentage value; and
   generate the at least one removal script for removal of the unknown malicious code when the probability relationship is less than the predetermined percentage value.

5. The VADS of claim 1, wherein at least one or more of the first, second and third modules is configured to:
   monitor the client system for detecting increased network traffic to the client system;
   determine whether detected increased network traffic is due to a malicious code or due to one of internal or external network activity;
   remove the malicious code using one or a known removal process or a heuristic removal process when the detected increased network traffic is due to a malicious code; and
   analyze the detected increased network traffic for hacks when the detected increased network traffic is due to external network activity.

6. The VADS of claim 5, wherein at least one or more of the first, second and third modules is further configured to:
   shut down the at least one client system when the detected increased network traffic is due to internal network activity.

7. The VADS of claim 5, wherein at least one or more of the first, second and third modules is further configured to:
   analyze the detected increased network traffic for hacks when the detected increased network traffic is due to external network activity by determining whether a detected hack is known or unknown.

8. The VADS of claim 7, wherein at least one or more of the first, second and third modules is further configured to:
   patch the at least one client system when the detected hack is known.

9. The VADS of claim 7, wherein at least one or more of the first, second and third modules is further configured to:
   continue capturing data about the detected hack when the detected hack is unknown;
   determine if an open port experiencing the detected increased network traffic is authorized;
   shut down the open port when the open port is not authorized; and
   generate a patch to stop the detected hack when the open port is authorized.

* * * * *